(No Model.)
S. COOPER & E. DENNIS.
PROCESS OF ADMINISTERING ANÆSTHETICS.
No. 258,632. Patented May 30, 1882.
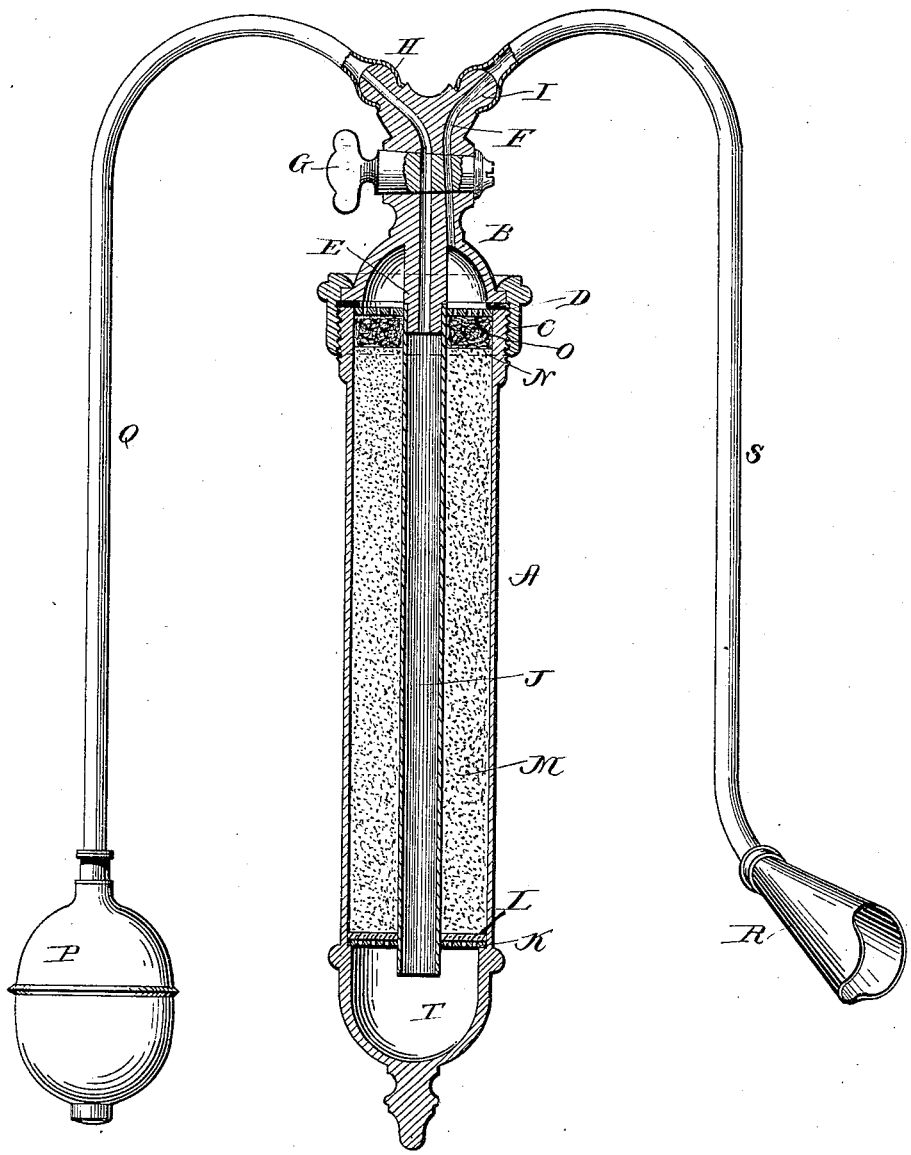
WITNESSES
Franck L. Ourand
Geo. M. Finckel
INVENTORS.
Sherman Cooper
Edward Dennis
by Ernest A. Webb
Attorney

UNITED STATES PATENT OFFICE.

SHERMAN COOPER, OF WESTFIELD, NEW JERSEY, AND EDWARD DENNIS, OF SING SING, NEW YORK; SAID DENNIS ASSIGNOR TO CHARLES HILBERT, OF SING SING, NEW YORK.

PROCESS OF ADMINISTERING ANÆSTHETICS.

SPECIFICATION forming part of Letters Patent No. 258,632, dated May 30, 1882.

Application filed January 21, 1882. (No model.)

*To all whom it may concern:*

Be it known that we, SHERMAN COOPER, of Westfield, in the county of Union and State of New Jersey, and EDWARD DENNIS, of Sing Sing, in the county of Westchester and State of New York, have invented a new and Improved Process of Administering Anæsthetics, of which the following description is a specification.

Our invention relates to an improved process for absorbing and administering anæsthetics—such as chloroform, ether, and the like—and for absorbing and distributing perfumes and disinfectants; and the invention consists in absorbing the anæsthetic, perfume, or disinfectant by means of a suitable absorbent packing—such as magnesia, for instance—confined in a closed receiver, and then discharging such anæsthetic, perfume, or disinfectant in the form of a dry gas by forcing air through the absorbent packing; and the invention also consists in suitable appliances whereby the distribution of the absorbed material can be practically accomplished by air-pressure, all as hereinafter fully described.

In the drawing a central sectional view of one form of appliance for absorbing and distributing the contained anæsthetic, perfume, or disinfectant is shown, the air-pump or bellows and discharge-funnel being shown in elevation.

In carrying out our invention we make use of an absorbent material—such, for instance, as magnesia—which we saturate or otherwise provide with the matter to be distributed. This matter we place in a close vessel or receptacle of approved construction, and connect such vessel or receptacle with an air-forcing apparatus in such manner that air may be driven into the receptacle and escape therefrom through the saturated absorbent, whereby it takes up and is loaded with the matter with which such absorbent is provided, and the air thereby is charged or impregnated with the absorbed matter in the form of a dry gas, such gas being conducted from the vessel to the place of use by any suitable device or devices. In this way anæsthetics may be administered and perfumes and disinfectants distributed.

In the administration of anæsthetics our process has the following advantages, viz: By the use of an absorbent material in a close vessel a large quantity of anæsthetic—as, for instance, chloroform or ether—can be concentrated so as to obtain the benefit of its strength, to thereby facilitate the putting of a person under its influence very quickly and without any waste of material by evaporation, as is the case when the anæsthetic is administered in the liquid state by means of cloths or sponges saturated therewith. Another advantage is that the administration of an anæsthetic in the form of a dry gas prevents the person or clothing of a patient from being injured or damaged by direct contact of a liquid anæsthetic, as is often the case when the cloth or sponge is supplied with more than it can take up. Anæsthetics when administered in the liquid form generally produce nausea, resulting in vomiting, which is extremely dangerous in many cases, especially so during the performance of any operation involving the stomach and bowels, or after there has been any such operation. When administered by our method, however, nausea is very rarely produced, and this element of danger is almost entirely removed. Furthermore, by our method of administering anæsthetics a due proportion of atmospheric air is mixed therewith, the resulting advantage of which is the lessening of the liability of fatal results and the rapidity of recovery from the efforts of its administration. Finally, by absorbing an anæsthetic and confining it in this condition within a close vessel or receptacle evaporation is greatly retarded, if not entirely prevented, when not in use, whereby a very considerable economy in material is effected; and we have found in practice that by our method this economy amounts to quite fifty per cent.

As an illustration of our invention, we have shown in the drawing above referred to an apparatus admirably adapted for administering anæsthetics.

The letter A designates a cylindrical shell, closed at one end and having a charging-opening at the other end. This opening is provided with a cap, B, at the lower end of which an outwardly-extending flange is arranged. This cap is connected with the shell A by a coupling-ring, C, having an inwardly-extending flange to engage the flange on the cap, and interiorly screw-threaded to engage a screw-thread on the exterior of the shell A at its opening. By interposing a compressible gasket, D, between the cap and the edge of the shell and screwing down the ring C upon the shell a perfectly-tight joint may be made between the shell and cap. The cap C is provided with an interior depending tube, E, and with a channel, F. A two-way plug, G, provided with openings to correspond with the tube E and channel F, is arranged to turn in said cap, so as to simultaneously open or close the tube E and channel F. The tube E terminates above the plug in a perforated knob, H, and the channel F is open from the interior of the cap through a terminal knob, I. A tube, J, depends from the tube E, and extends nearly to the bottom of the shell A. A foraminous partition, K, is arranged in the bottom of the shell A, and the tube J extends through this partition. A fibrous disk, L, is laid upon the partition K, and upon this disk, within the shell, is superposed a packing or filling, M, of pulverulent material, which may be magnesia; but other powder or fibrous material may be used. Above this packing is arranged fibrous material, N, and above it is placed a foraminous partition, O. The disk L and material N serve to prevent the packing M when it is pulverulent from sifting. The partition K rests upon a shoulder made somewhat above the bottom of the shell, whereby a chamber, T, is provided below the packing, such chamber being in open communication with the tubes J and E.

P is a bulb or other air-forcing device, connected with the tube E, as by a rubber tube, Q, stretched over the knob H.

R is an inhaler connected with the channel F, as by a rubber tube, S, stretched over the knob I.

In operation, the packing M having been saturated with the desired anæsthetic, the plug G is turned to open the tube E and channel F. Air is then forced into the apparatus, and descends through tubes E and J into the air-chamber T. The pressure under which it is forced thereinto drives it upward through the saturated packing, whereby it is charged or impregnated with the anæsthetic, and escapes thence, thus charged or impregnated, through the channel F in the form of a dry gas, and is utilized by means of the inhaler R.

The apparatus shown and described can be utilized for distributing perfumes or disinfectants in the form of dry gases; and in order to distribute such gas in jets, so as to diffuse it, a rose can be substituted for the inhaler R.

Before our invention anæsthetics have been absorbed in suitable packing, such as sponge, arranged in a vessel of convenient shape for the use intended, and the anæsthetic has been administered by drawing, by natural inspiration, the same through the vessel applied to the mouth or nose, and in all such apparatus the air-supply has been obtained by the action of the lungs drawing it into the vessel through apertures therein, whence it passes through and is laden with the anæsthetic. Medicines have been locally administered by placing them in a water bath in a close vessel, such vessel having an attached air-forcing apparatus and means for applying the medicine in the form of vapor or spray caused by forcing the air through it, whereby catarrhal and other like maladies may be treated. We are not, however, aware that anæsthetizing has been practiced before our invention by forcing a current of air through the anæsthetic when it is so held, as that the anæsthetizing-vapor is expelled in the form of a dry gas.

What we claim as our invention, and desire to secure by Letters Patent, is—

1. That improvement in the art of administering anæsthetics which consists, first, in inclosing material saturated with the anæsthetic in a close vessel, so as to prevent waste or escape thereof; second, opening such inclosed anæsthetic to the admission of air, and, finally, forcing the air by external mechanical means through such anæsthetic, whereby it is laden with the anæsthetic and is forcibly expelled in the form of a dry gas at the point of application.

2. As a means for administering anæsthetics in the form of a dry gas, the cylindrical shell A, its cap B, and plug or valve G, forming an air-tight vessel, the absorbent packing M, means to forcibly drive a current of air through said packing, and means to convey such forced current to the point of application, substantially as shown and described.

3. The shell A, its tubular cap B, a valve controlling the tubes in such cap, means to confine a packing within such shell, a tube, J, extending through the cap to near the bottom of the shell, an air-forcing apparatus, P Q, and an applying device, R S, substantially as and for the purpose described.

The foregoing specification of our new and improved process for administering anæsthetics signed by us this 7th day of January, A. D. 1882.

SHERMAN COOPER.
EDWARD DENNIS.

Witnesses:
N. H. DENNIS,
ERNEST C. WEBB.